(12) United States Patent
Lee et al.

(10) Patent No.: US 9,369,960 B2
(45) Date of Patent: Jun. 14, 2016

(54) METHOD FOR OPERATION BASED ON SWITCHING DISCONTINUOUS RECEPTION STATE IN WIRELESS COMMUNICATION SYSTEM AND APPARATUS FOR THE SAME

(75) Inventors: Kyung Jun Lee, Anyang-si (KR); Sung Duck Chun, Anyang-si (KR); Sung Jun Park, Anyang-si (KR); Jae Wook Lee, Anyang-si (KR); Sung Hoon Jung, Anyang-si (KR); Young Dae Lee, Anyang-si (KR); Seung June Yi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 14/343,704

(22) PCT Filed: Aug. 9, 2012

(86) PCT No.: PCT/KR2012/006352
§ 371 (c)(1),
(2), (4) Date: Mar. 7, 2014

(87) PCT Pub. No.: WO2013/035984
PCT Pub. Date: Mar. 14, 2013

(65) Prior Publication Data
US 2014/0247742 A1    Sep. 4, 2014

Related U.S. Application Data

(60) Provisional application No. 61/532,536, filed on Sep. 8, 2011, provisional application No. 61/536,531, filed on Sep. 19, 2011, provisional application No. 61/539,469, filed on Sep. 26, 2011.

(51) Int. Cl.
*G01R 31/08* (2006.01)
*G08C 17/00* (2006.01)
*H04W 52/02* (2009.01)
*H04W 76/04* (2009.01)
*H04W 24/10* (2009.01)
*H04W 36/30* (2009.01)

(52) U.S. Cl.
CPC .......... *H04W 52/0229* (2013.01); *H04W 24/10* (2013.01); *H04W 52/0216* (2013.01); *H04W 76/048* (2013.01); *H04W 36/30* (2013.01); *H04W 52/0245* (2013.01); *H04W 52/0258* (2013.01)

(58) Field of Classification Search
CPC .......................... H04W 52/02; H04W 52/0229
USPC ........................................................ 370/252
See application file for complete search history.

(56) References Cited

U.S. PATENT DOCUMENTS

2007/0291729 A1    12/2007  Dalsgaard et al.
2010/0118752 A1*   5/2010   Suzuki ............... H04W 76/048
                                                370/311
2010/0208660 A1*   8/2010   Ji ..................... H04W 52/0225
                                                370/328

(Continued)

*Primary Examiner* — Gerald Smarth
(74) *Attorney, Agent, or Firm* — Birch, Stewart, Kolasch & Birch, LLP

(57) ABSTRACT

An operation method performed by user equipment in a wireless communication system is provided. The method includes: determining whether to switch a Discontinuous Reception (DRX) state; switching to a new DRX state and operating in the new DRX state, if it is determined to switch to the DRX state; and reporting the switch to the new DRX state to a network. The new DRX state is based on a new DRX cycle comprising on-duration for which a downlink channel is monitored and off-duration for which the downlink channel is not monitored.

16 Claims, 12 Drawing Sheets

(56) References Cited

U.S. PATENT DOCUMENTS

| | | | |
|---|---|---|---|
| 2010/0317345 A1* | 12/2010 | Futaki | H04W 36/0055 455/436 |
| 2010/0323683 A1* | 12/2010 | Kazmi | H04W 64/00 455/422.1 |
| 2011/0182224 A1* | 7/2011 | Ishii | H04W 56/005 370/311 |
| 2012/0120815 A1* | 5/2012 | Anderson | H04W 76/048 370/252 |
| 2012/0120843 A1* | 5/2012 | Anderson | H04W 52/0232 370/253 |

* cited by examiner

METHOD FOR OPERATION BASED ON SWITCHING DISCONTINUOUS RECEPTION STATE IN WIRELESS COMMUNICATION SYSTEM AND APPARATUS FOR THE SAME

CROSS-REFERENCE TO RELATED APPLICATIONS

This application is the National Phase of PCT/KR2012/006352 filed on Aug. 9, 2012, which claims priority under 35 U.S.C. §119(e) to U.S. Provisional Application No. 61/532,536 filed on Sep. 8, 2011, U.S. Provisional Application No. 61/536,531 filed on Sep. 19, 2011, and U.S. Provisional Application No. 61/539,469 filed on Sep. 26, 2011, all of which are hereby expressly incorporated by reference into the present application.

TECHNICAL FIELD

The present invention relates to wireless communication and, more particularly, to a method for operating based on switching a discontinuous reception (DRX) state performed by a user equipment and an apparatus for supporting the same.

BACKGROUND ART

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

In general, discontinuous reception (DRX) is a scheme in which UE monitors a downlink channel discontinuously so that the consumption of a battery is reduced. When DRX is configured, UE monitors a downlink channel discontinuously. If DRX is not configured, the UE monitors a downlink channel continuously.

Recently, lots of applications require an always-on characteristic. The term 'always-on' means a characteristic in which UE is always connected to a network and it can send data immediately if necessary.

If UE continues to access a network, however, the consumption of the battery is great. For this reason, if DRX suitable for a corresponding application is configured, the consumption of the battery can be reduced and the always-on characteristic can be guaranteed.

As small cells having small coverage, such as a pico cell and a femto cell, are recently introduced, the mobility of UE has increased. In this wireless communication system, there is a new discussion on an optimal DRX configuration, change and/or application thereof in relation to interference from neighbor cells, a measurement report, and handover.

SUMMARY OF INVENTION

Technical Problem

An object of the present invention is to provide an operation method of UE based on a switch of a DRX state in a wireless communication system and an apparatus for supporting the same.

Solution to Problem

In an aspect, an operation method performed by user equipment in a wireless communication system is provided. The method includes: determining whether to switch a Discontinuous Reception (DRX) state; switching to a new DRX state and operating in the new DRX state, if it is determined to switch to the DRX state; and reporting the switch to the new DRX state to a network. The new DRX state is based on a new DRX cycle comprising on-duration for which a downlink channel is monitored and off-duration for which the downlink channel is not monitored.

The step of determining whether to switch a DRX state may include determining to switch to the DRX state when the user equipment enters a specific area.

The method may further include switching to a previous DRX state and operating in the previous DRX state when the user equipment is out of the specific area.

The method may further include receiving information about the specific area from the network. The information about the specific area may include a central position of the specific area, a radius of the specific area and a valid time of the information about the specific area.

The method may further include switching to a previous DRX state and operating in the previous DRX state when the valid time elapses from a point of time at which the information about the specific area was received.

The specific area may be an area where a small cell that the user equipment has visited before is placed; and the user equipment may enter the specific area when a distance between a position of the user equipment and a position of the small cell is smaller than a specific value.

The method may further include receiving a measurement configuration from the network. The measurement configuration may include measurement object information indicating a measurement object to be measured by the user equipment; and measurement report event information indicating a condition for reporting a measurement value for the measurement object. The step of determining to switch the DRX state may include determining to switch to the DRX state when the measurement value for the measurement object satisfies the condition indicated by the measurement report event information.

If the user equipment is In-Device Coexistence (IDC) user equipment and the user equipment comprises other coexistence communication module, the user equipment may determine to switch the DRX state based on IDC internal interference according to a start of an operation of the other coexistence communication module.

The method may further include receiving information about the new DRX state. The information about the new DRX state may include a validity timer indicating the new DRX cycle and duration of the new DRX state.

The method may further include switching to a previous DRX state and operating in the previous DRX state if time indicated by the validity timer elapses after switching to the new DRX state.

In another aspect, a user equipment operating in a wireless communication system is provided. The user equipment includes: a Radio Frequency (RF) unit configured to transmit and receive radio signals; and a processor functionally connected to the RF unit. The processor is configured to: determine whether to switch a Discontinuous Reception (DRX) state; switch to a new DRX state and operate in the new DRX state, if it is determined to switch to the DRX state; and report the switch to the new DRX state to a network. The new DRX state is based on a new DRX cycle including on-duration for which a downlink channel is monitored and off-duration for which the downlink channel is not monitored.

Advantageous Effects of Invention

In a wireless communication system in which the introduction of small cells having small coverage, such as a pico cell and/or a femto cell, is spread, UE switches a DRX state when specific conditions are satisfied or when specific conditions occur. UE may use a new DRX cycle, such as a short DRX cycle, instead of the existing DRX cycle according to circumstances. In this case, UE can receive a handover command message more quickly in a situation in which interference from small cells may occur so that mobility by the UE can be properly performed. Accordingly, reliability of the transmission and reception of radio signals can be improved because UE can avoid interference due to neighboring cells, and thus the throughput of the entire wireless communication system can be improved.

MODE FOR THE INVENTION

Figure 1:
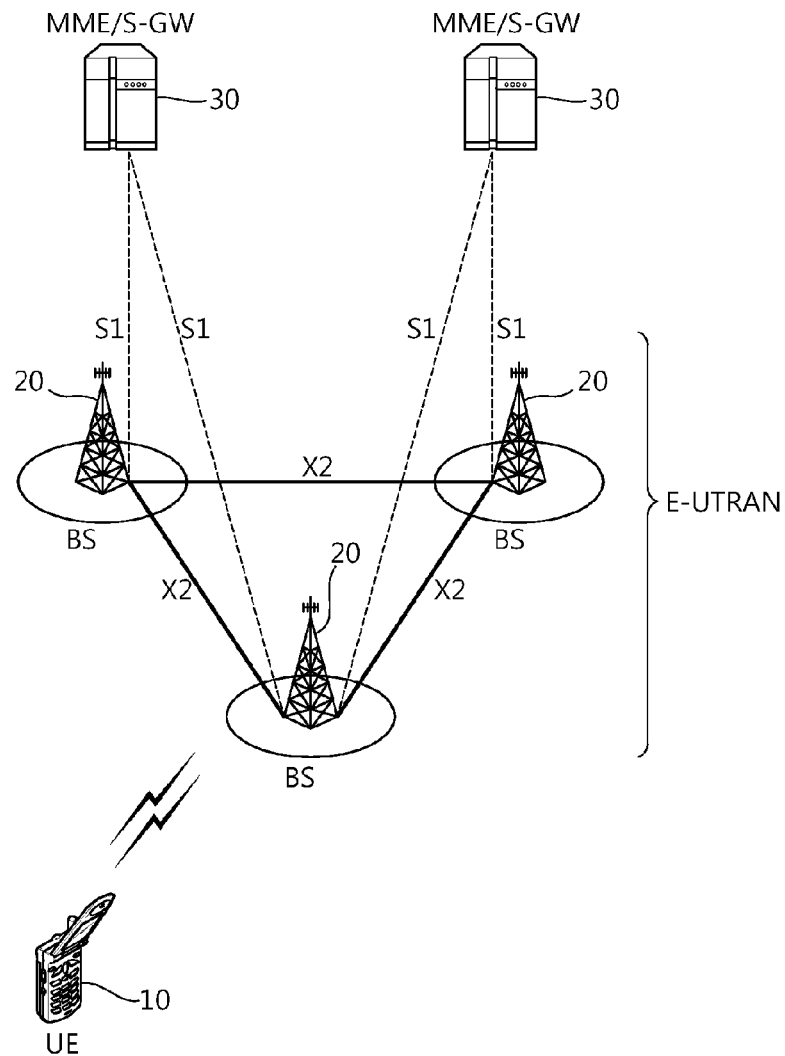
FIG. 1 illustrates a wireless communication system to which the present invention is applied.

FIG. 1 illustrates a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an $X_2$ interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
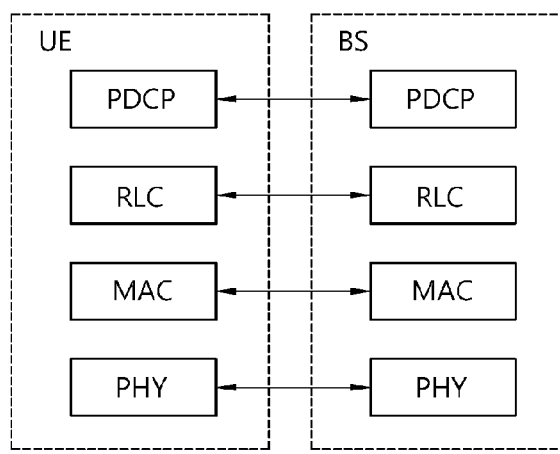
FIG. 2 is a diagram illustrating a radio protocol architecture for a user plane.
Figure 3:
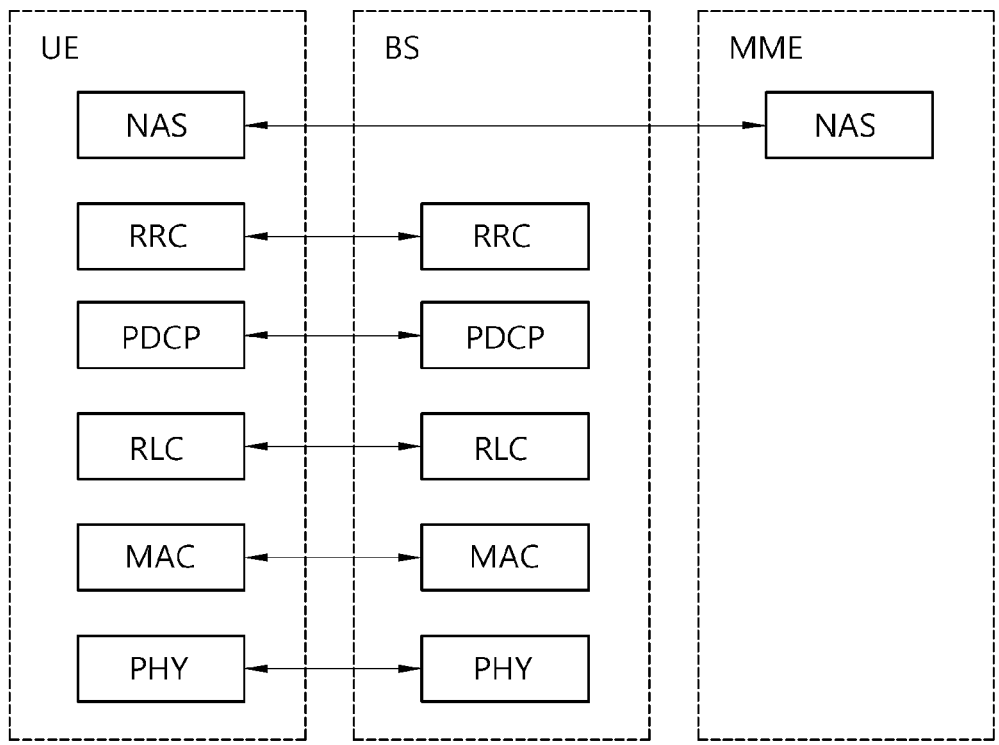
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and re-assembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., PHY layer) and the second layer (i.e., MAC layer, RLC layer, and PDCP layer) for data delivery between the UE and the network.

The configuration of the RB implies a process for specifying a radio protocol layer and channel properties to provide a specific service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection exists between an RRC layer of the UE and an RRC layer of the network, the UE is in an RRC connected state, and otherwise the UE is in an RRC idle state.

Data are transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several symbols in a time domain and several sub-carriers in a frequency domain. One sub-frame includes a plurality of symbols in the time domain. One subframe includes a plurality of resource blocks. One resource block includes a plurality of symbols and a plurality of sub-carriers. Further, each subframe may use specific sub-carriers of specific symbols (e.g., a first symbol) of a corresponding subframe for a physical downlink control channel (PDCCH), i.e., an L1/L2 control channel. A transmission time interval (TTI) is a unit time of data transmission, and is 1 millisecond (ms) which corresponds to one subframe.

As disclosed in 3GPP TS 36.211 V8.7.0, the 3GPP LTE classifies a physical channel into a data channel, i.e., a physical downlink shared channel (PDSCH) and a physical uplink shared channel (PUSCH), and a control channel, i.e., a physical downlink control channel (PDCCH), a physical control format indicator channel (PCFICH) and a physical hybrid-ARQ indicator channel (PHICH), and a physical uplink control channel (PUCCH).

The PCFICH transmitted in a 1st OFDM symbol of the subframe carries a control format indicator (CFI) regarding the number of OFDM symbols (i.e., a size of the control region) used for transmission of control channels in the subframe. The UE first receives the CFI on the PCFICH, and thereafter monitors the PDCCH.

The PDCCH is a downlink control channel, and is also called a scheduling channel in a sense that it carries scheduling information. Control information transmitted through the PDCCH is referred to as downlink control information (DCI). The DCI may include resource allocation of the PDSCH (this is referred to as a downlink (DL) grant), resource allocation of a PUSCH (this is referred to as an uplink (UL) grant), a set of transmit power control commands for individual UEs in any UE group and/or activation of a voice over Internet protocol (VoIP).

The 3GPP LTE uses blind decoding for PDCCH detection. The blind decoding is a scheme in which a desired identifier is de-masked from a CRC of a PDCCH (referred to as a candidate PDCCH) to determine whether the PDCCH is its own channel by performing CRC error checking.

A BS determines a PDCCH format according to DCI to be transmitted to a UE. Thereafter, the BS attaches a cyclic redundancy check (CRC) to the DCI, and masks a unique identifier (referred to as a radio network temporary identifier (RNTI)) to the CRC according to an owner or usage of the PDCCH.

Hereinafter, an RRC state of a UE and an RRC connection will be disclosed.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a procedure of registering to the network through an initial attach procedure. If the attach procedure is successfully completed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When a UE in the ECM-IDLE state establishes an RRC connection with the E-UTRAN, the UE enters the ECM-CONNECTED state. When an MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UEbased mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

The following description is related to measurement and measurement report.

It is necessary for a mobile communication system to support mobility of a UE. Therefore, the UE persistently measures quality of a serving cell providing a current service and quality of a neighboring cell. The UE reports a measurement result to a network at a proper time. The network provides optimal mobility to the UE by using a handover or the like. Measurement for this purpose is commonly called Radio Resource Management (RRM).

To provide information which can be helpful for a network operation of a service provider in addition to the purpose of supporting the mobility, the UE may perform measurement with a specific purpose determined by the network, and may report the measurement result to the network. For example, the UE receives broadcast information of a specific cell determined by the network. The UE may report to a serving cell a cell identify (also referred to as a global cell identity) of the specific cell, location identification information indicating a location of the specific cell (e.g., a tracking area code), and/or other cell information (e.g., whether it is a member of a closed subscriber group (CSG) cell).

In a state of moving, if the UE determines that quality of a specific region is significantly bad, the UE may report a measurement result and location information on cells with bad quality to the network. The network may attempt to optimize the network on the basis of the measurement result reported from UEs which assist the network operation.

In a mobile communication system having a frequency reuse factor of 1, mobility is generally supported between different cells existing in the same frequency band. Therefore, in order to properly guarantee the UE mobility, the UE has to properly measure cell information and quality of neighboring cells having the same center frequency as a center frequency of a serving cell. Measurement on a cell having the same center frequency as the center frequency of the serving cell is referred to as intra-frequency measurement. The UE performs the intra-frequency measurement and reports a measurement result to the network, so as to achieve the purpose of the measurement result.

A mobile communication service provider may perform a network operation by using a plurality of frequency bands. If a service of a communication system is provided by using the plurality of frequency bands, optimal mobility can be guaranteed to the UE when the UE is able to properly measure cell information and quality of neighboring cells having a different center frequency from the center frequency of the serving cell. Measurement on a cell having the different center frequency from the center frequency of the serving cell is referred to as inter-frequency measurement. The UE has to be able to perform the inter-frequency measurement and report a measurement result to the network.

When the UE supports measurement on a heterogeneous network, measurement on a cell of the heterogeneous network may be performed according to a configuration of a BS. Such a measurement on the heterogeneous network is referred to as inter-radio access technology (RAT) measurement. For example, RAT may include a GMS EDGE radio access network (GERAN) and a UMTS terrestrial radio access network (UTRAN) conforming to the 3GPP standard, and may also include a CDMA 200 system conforming to the 3GPP2 standard.

Figure 4:
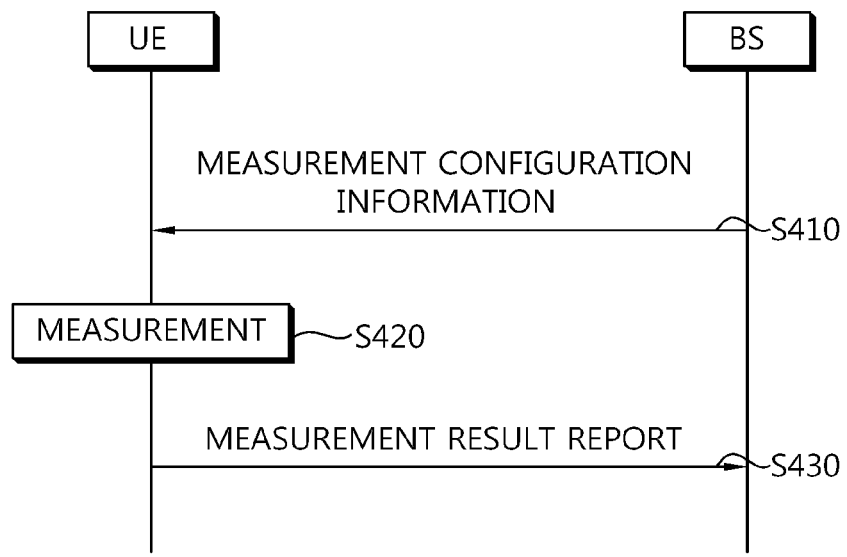
FIG. 4 is a flowchart showing a conventional method of performing measurement.

FIG. 4 is a flowchart showing a conventional method of performing measurement.

A UE receives measurement configuration information from a BS (step S410). A message including the measurement configuration information is referred to as a measurement configuration message. The UE performs measurement based on the measurement configuration information (step S420). If a measurement result satisfies a reporting condition included in the measurement configuration information, the UE reports the measurement result to the BS (step S430). A message including the measurement result is referred to as a measurement report message.

The measurement configuration information may include the following information.

(1) Measurement object: The object is on which the UE performs the measurements. The measurement object includes at least one of an intra-frequency measurement object which is an object of intra-frequency measurement, an inter-frequency measurement object which is an object of inter-frequency measurement, and an inter-RAT measurement object which is an object of inter-RAT measurement. For example, the intra-frequency measurement object may indicate a neighboring cell having the same frequency as a frequency of a serving cell, the inter-frequency measurement object may indicate a neighboring cell having a different frequency from a frequency of the serving cell, and the inter-RAT measurement object may indicate a neighboring cell of a different RAT from an RAT of the serving cell.

(2) Reporting configuration: This includes a reporting criterion and a reporting format. The reporting criterion is used to trigger the UE to send a measurement report and can either be periodical or a single event description. The reporting format is a quantity that the UE includes in the measurement report and associated information (e.g. number of cells to report).

(3) Measurement identify: Each measurement identity links one measurement object with one reporting configuration. By configuring multiple measurement identities, it is possible to link more than one measurement object to the same reporting configuration, as well as to link more than one reporting configuration to the same measurement object. The measurement identity is used as a reference number in the measurement report. The measurement identify may be included in the measurement report to indicate a specific measurement object for which the measurement result is obtained and a specific reporting condition according to which the measurement report is triggered.

(4) Quantity configuration: One quantity configuration is configured per RAT type. The quantity configuration defines the measurement quantities and associated filtering used for all event evaluation and related reporting of that measurement type. One filter can be configured per measurement quantity.

(5) Measurement gaps: Measurement gaps are periods that the UE may use to perform measurements when downlink transmission and uplink transmission are not scheduled.

To perform a measurement procedure, the UE has a measurement object, a reporting configuration, and a measurement identity.

In 3GPP LTE, the BS can assign only one measurement object to the UE with respect to one frequency. Events for triggering measurement reporting shown in the table below are defined in the section 5.5.4 of 3GPP TS 36.331 V8.5.0

(2009-03) "Evolved Universal Terrestrial Radio Access (E-UTRA) Radio Resource Control (RRC); Protocol specification (Release 8)".

TABLE 1

| Events | Reporting Condition |
|---|---|
| Event A1 | Serving becomes better than threshold |
| Event A2 | Serving becomes worse than threshold |
| Event A3 | Neighbor becomes offset better than serving |
| Event A4 | Neighbor becomes better than threshold |
| Event A5 | Serving becomes worse than threshold1 and neighbor becomes better than threshold2 |
| Event B1 | Inter RAT neighbor becomes better than threshold |
| Event B2 | Serving becomes worse than threshold1 and inter RAT neighbor becomes better than threshold2 |

If the measurement result of the UE satisfies the determined event, the UE transmits a measurement report message to the BS.

Figure 5:
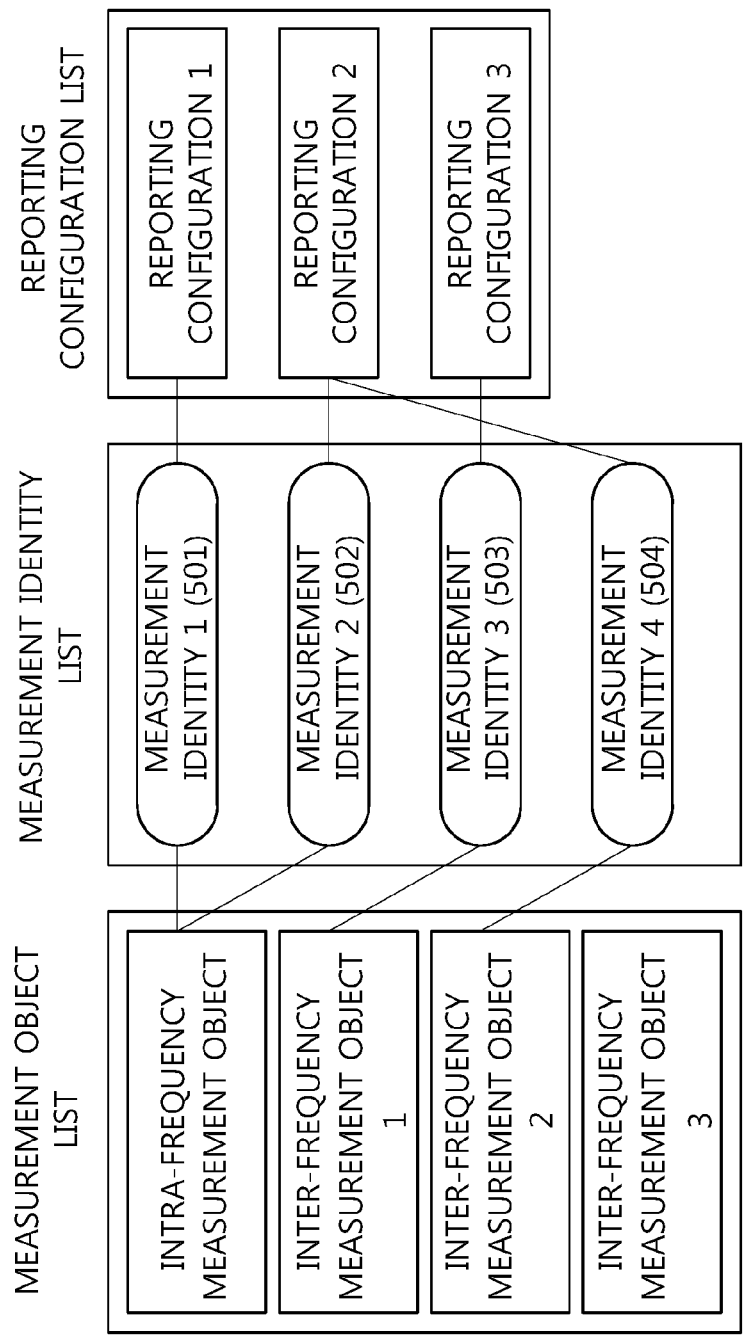
FIG. 5 shows an example of a measurement configuration assigned to a UE.

FIG. 5 shows an example of a measurement configuration assigned to a UE.

First, a measurement identity1 501 associates an intra-frequency measurement object with a reporting configuration 1. The UE performs intra-frequency measurement. The reporting configuration 1 is used to determine a reporting type and a criterion for reporting a measurement result.

A measurement identity2 502 is associated with the intra-frequency measurement object similarly to the measurement identifier 1 501, and associates the intra-frequency measurement object with a reporting configuration 2. The UE performs intra-frequency measurement. The reporting configuration 2 is used to determine a reporting format and a criterion for reporting a measurement result.

By using the measurement identity1 501 and the measurement identity2 502, the UE transmits a measurement result even if the measurement result on the intra-frequency measurement object satisfies any one of the reporting configuration 1 and the reporting configuration 2.

A measurement identity3 503 associates an inter-frequency measurement object 1 with a reporting configuration 3. When a measurement result on the inter-frequency measurement object 1 satisfies a reporting criterion included in the reporting configuration 1, the UE reports the measurement result.

A measurement identity4 504 associates an inter-frequency measurement object 2 with the reporting configuration 2. When a measurement result on the inter-frequency measurement object 2 satisfies a reporting criterion included in the reporting configuration 2, the UE reports the measurement result.

Meanwhile, the measurement object, the reporting configuration, and/or the measurement identity can be added, modified, and/or deleted. To instruct such operations, the BS may transmit to the UE a new measurement configuration message or a measurement configuration modification message.

Figure 6:
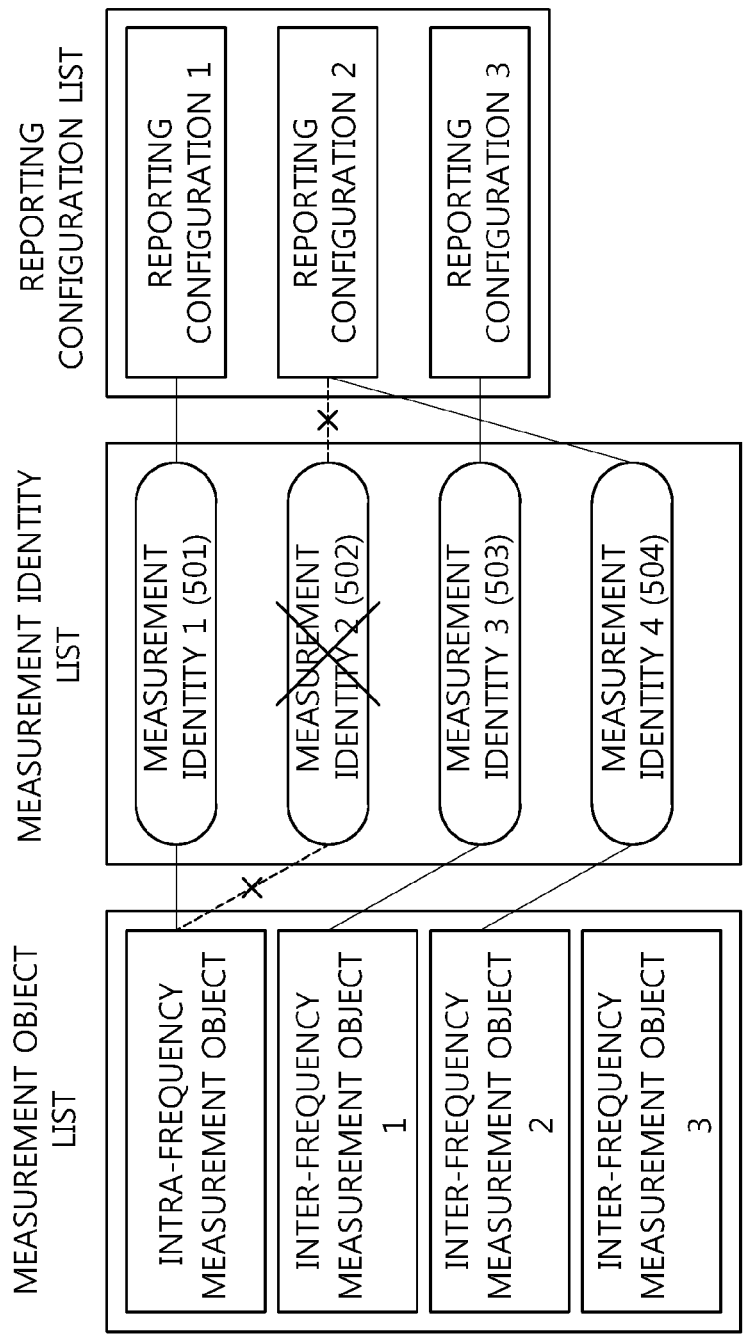
FIG. 6 shows an example of deleting a measurement identity.

FIG. 6 shows an example of deleting a measurement identity. When a measurement identity2 502 is deleted, measurement on a measurement object associated with the measurement identity2 502 is suspended, and a measurement report is not transmitted. A reporting configuration or a measurement object associated with the deleted measurement identity may not be modified.

Figure 7:
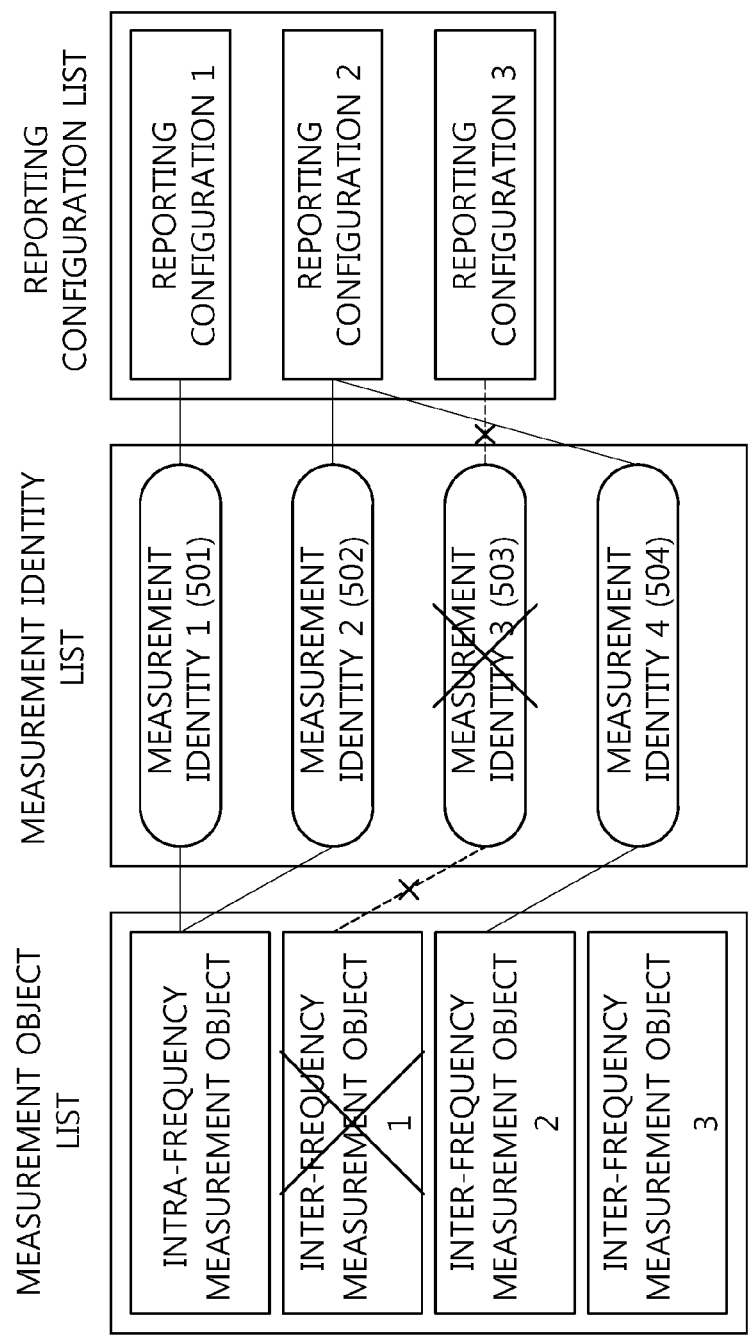
FIG. 7 shows an example of deleting a measurement object.

FIG. 7 shows an example of deleting a measurement object. When an inter-frequency measurement object 1 is deleted, a UE also deletes an associated measurement identifier3 503. Measurement on the inter-frequency measurement object 1 is suspended, and a measurement report is not transmitted. However, a reporting configuration associated with the deleted inter-frequency measurement object 1 may not be modified or deleted.

When the reporting configuration is deleted, the UE also deletes an associated measurement identifier. The UE suspends measurement on an associated measurement object according to the associated measurement identifier. However, a measurement object associated with the deleted reporting configuration may not be modified or deleted.

The measurement report may include a measurement identity, a measured quantity of a serving cell and a measurement result of a neighboring cell. The measurement identity identifies a measurement object on which the measurement report is triggered. The measurement result of the neighboring cell may include a cell identity of the neighboring cell and a measured quantity of the neighboring cell. The measured quantity may include at least one of Reference Signal Received Power (RSRP) and Reference Signal Received Quality (RSRQ).

In-Device Coexistence (IDC) and IDC interference are described below.

In order for a user to access a variety of networks anywhere and anytime, not only transceivers for wireless communication systems, such as LTE, WiFi, and Bluetooth (BT), but also a Global Navigation Satellite System (GNSS) receiver needs to be mounted on one UE. The coexistence of different wireless communication systems in one UE as described above is called In-Device Coexistence (IDC). Examples of the coexistence may include UE on which LTE and BT modules are mounted in order to receive VoIP service and multimedia service using a BT earphone, UE on which LTE and WiFi modules are mounted in order to distribute traffic, and UE on which GNSS and LTE modules are mounted in order to obtain position information additionally.

Figure 8:
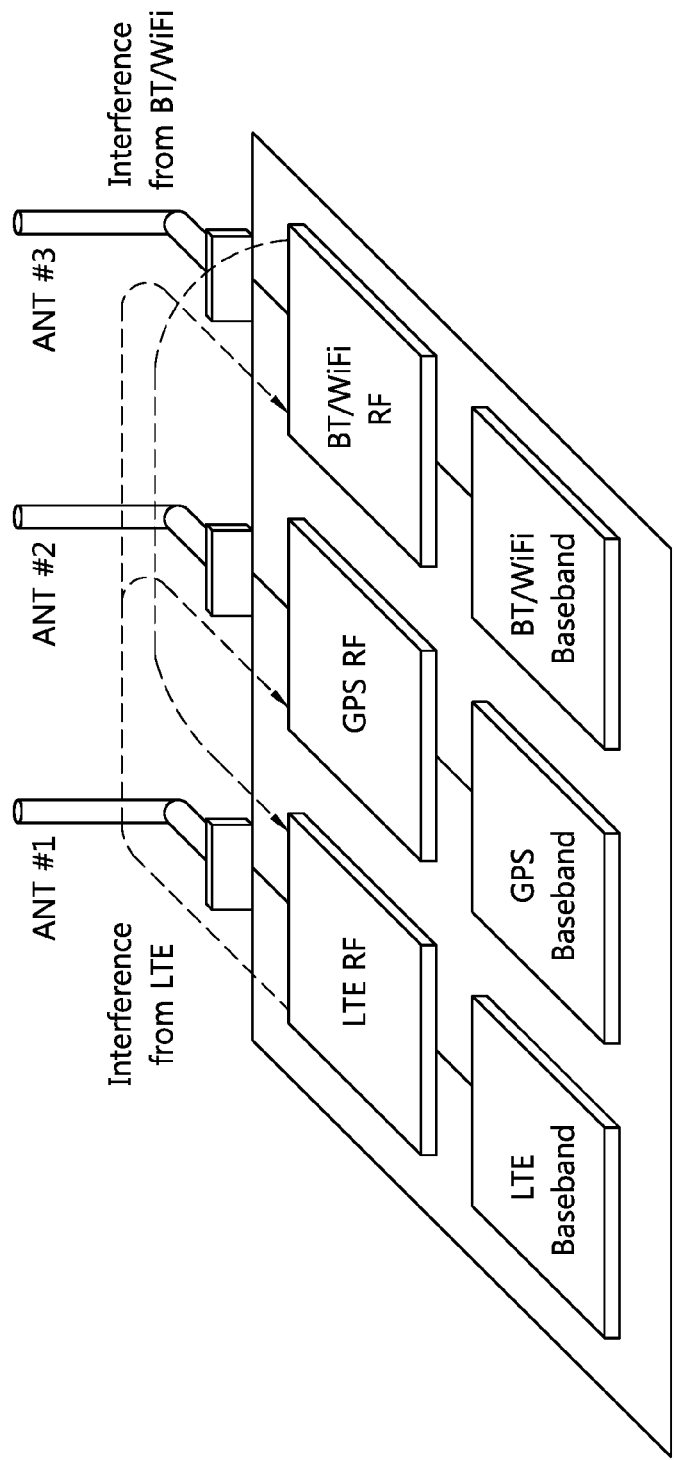
FIG. 8 illustrates UE including wireless communication modules for an LTE system, a Global Positioning System (GPS), and a BT/WiFi system.

FIG. 8 illustrates UE including wireless communication modules for an LTE system, a Global Positioning System (GPS), and a BT/WiFi system.

Referring to FIG. 8, in the case of the above UE, the power of a signal transmitted by one transmitter may be greater than the power of a signal received by another receiver because the several transceivers are placed close to each other within one UE. In this case, interference may occur between the other communication modules, and this interference is called IDC interference. If IDC interference increases, a ping-pong phenomenon in which UE continues to attempt handover although there is no problem in connection with a BS may occur.

In general, the communication modules may operate in neighboring frequencies as follows from a viewpoint of the frequency in order to reduce mutual interference.

The LTE module may operate in a TDD band 40 (2300 MHz~2400 MHz), and the WiFi module or the BT module may operate in an unlicensed band, that is, 2400 MHz~2483.5 MHz. In this case, the transmission of the LTE module may give interference to the WiFi module or the BT module, and the transmission of the WiFi module or the BT module may give interference to the reception of the LTE module.

Furthermore, the LTE module may perform uplink transmission in an FDD band 7 (2500 MHz~2700 MHz), and the BT module may operate in the unlicensed band, that is, 2400 MHz~2483.5 MHz. In this case, the uplink transmission of the LTE module may give interference to the reception of the WiFi module or the BT module.

Furthermore, the LTE module may operated in an FDD band 13 (UL: 777-787 MHz, DL: 746-756 MHz) or an FDD band 14 (UL: 788-798 MHz, DL: 758-768 MHz), and the GPS module may receive position information in a frequency of 1575.42 MHz. In this case, the uplink transmission of the LTE module may make interference to the reception of position information by the GPS module.

As one of solutions for solving this problem, a sufficient interval may be secured between physical filters or between the frequencies of transmission and reception signals in order to prevent IDC interference between two transceivers. If several wireless communication modules operate in neighboring frequencies, however, it is difficult to suppress interference sufficiently using the current filter technology.

Separately from a method using the physical filter scheme, an IDC interference avoidance scheme may be taken into consideration in relation to the following three cases depending on whether there is coordination with another communication module that coexists along with an LTE module and whether there is coordination for removing IDC interference between an LTE module and a BS.

In the first case, there is no coordination for IDC interference avoidance between communication modules and between an LTE module and a BS which coexist in one UE. In this case, the LTE module does not know information about the coexisting communication modules.

In the second case, there is only coordination between communication modules that coexist within UE. In this case, an operating state (i.e., ON/OFF state) between the coexisting modules and a traffic transmission state may be known.

In the third case, there are coordination between coexistence modules within UE and coordination between the UE and a BS. In this case, an LTE module can measure IDC interference through not only coordination with other modules, but also inter/intra frequency measurement.

In current 3GPP, in order to solve IDC interference, 1) a method in which an interfering communication module or an interfered communication module changes a frequency (Frequency Division Multiplexing (FDM)), 2) a method in which communication modules sharing one frequency divide and use the time (Time Division Multiplexing (TDM)), and 3) a method in which an LTE module reduces interference with other coexisting modules by controlling transmit power (LTE Power control (LTE PC)) are taken into consideration. As the method of dividing and using the time, to use the existing DRX procedure is taken into consideration in 3GPP.

Discontinuous Reception (DRX) in 3GPP LTE is described below.

DRX is a scheme for reducing the consumption of the battery of UE in such a manner that the UE monitors a downlink channel discontinuously.

Figure 9:
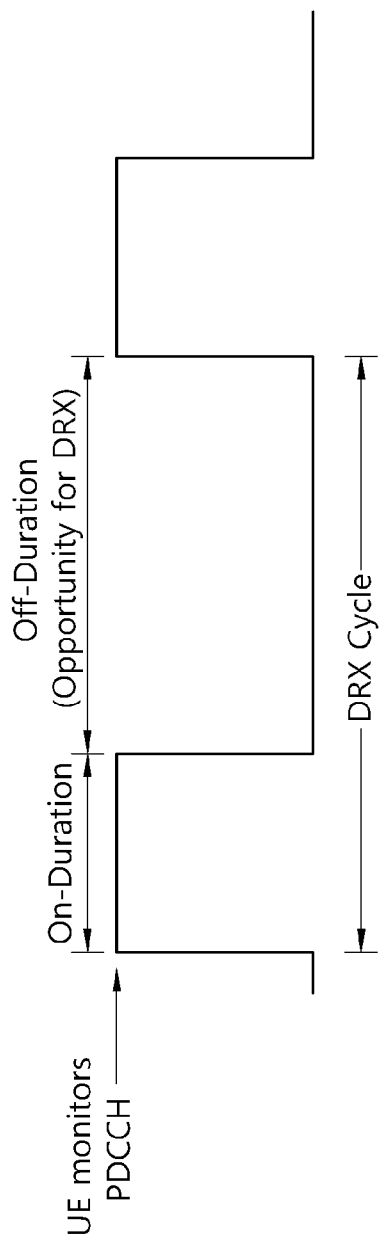
FIG. 9 shows a DRX cycle.

FIG. 9 shows a DRX cycle.

The DRX cycle specifies the periodic repetition of on-duration in which a possible inactivity section is connected. The DRX cycle includes the on-duration and off-duration. In the on-duration, UE monitors a PDCCH within the DRX cycle.

When DRX is configured, UE may monitor a PDCCH only in the on-duration, but may not monitor a PDCCH in the off-duration.

An on Duration timer is used to define the on-duration. The on-duration may be defined as duration for which the on Duration timer is operating. The on Duration timer specifies the number of consecutive PDCCH-subframes at a point of time at which the DRX cycle is started. The PDCCH-subframe refers to a subframe in which the PDCCH is monitored.

In addition to the DRX cycle, duration for which a PDCCH is monitored may be further defined. The duration for which a PDCCH is monitored is collectively referred to as an active time.

A drx-Inactivity timer inactivates DRX. When the drx-Inactivity timer operates, UE continues to monitor a PDCCH irrespective of a DRX cycle. The drx-Inactivity timer is initiated when an initial UL grant or DL grant is received on a PDCCH. The drx-Inactivity timer may specify the number of consecutive PDCCH-subframes after successfully decoding a PDCCH that indicates initial UL or DL user data transmission for corresponding UE.

An HARQ RTT timer defines minimum duration that UE expects DL HARQ retransmission. The HARQ RTT timer may specify a minimum number of subframes before DL HARQ retransmission that is expected by UE.

A drx-Retransmission timer defines duration for which UE monitors a PDCCH while DL retransmission is expected. The drx-Retransmission timer may specify a maximum number of consecutive PDCCH-subframes immediately after DL retransmission that is expected by UE. After initial DL transmission, UE drives the HARQ RTT timer. When an error in the initial DL transmission is detected, the UE sends NACK to a BS, stops the HARQ RTT timer, and drives the drx-Retransmission timer. While the drx-Retransmission timer operates, the UE monitors a PDCCH for DL retransmission from a BS.

The active time may include the on-duration for which a PDCCH is periodically monitored and duration for which a PDCCH is monitored owing to the occurrence of an event.

If the DRX cycle is set, the active time may include the following times:

An on Duration timer, a drx-Inactivity timer, a drx-Retransmission timer and/or a mac-ContentionResolution timer being driven;

Time when a scheduling request is transmitted on a PUCCH and is pending;

Time when an UL grant for pending HARQ retransmission may be generated and data exists within a corresponding HARQ buffer;

Time when a PDCCH indicated new transmission toward the C-RNTI of UE is not received after the successfully reception of a random access response for a preamble selected by the UE.

Figure 10:
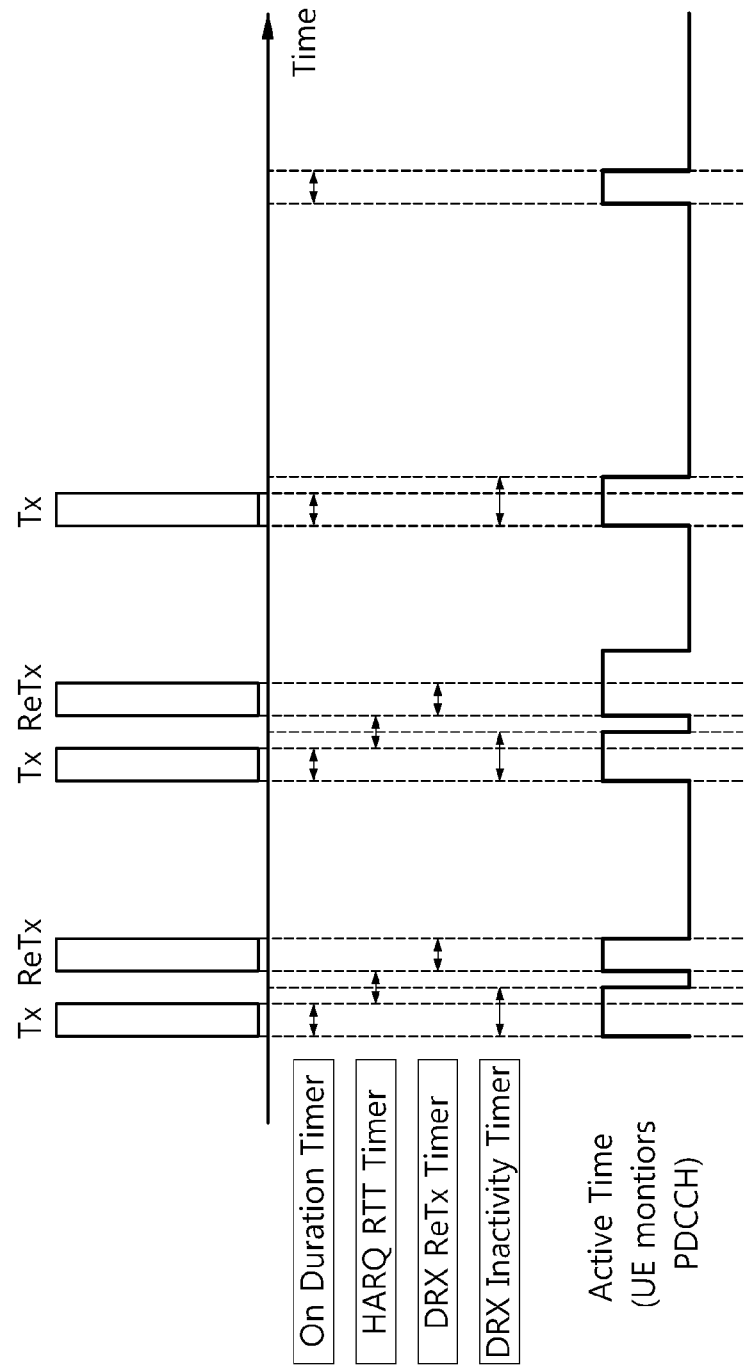
FIG. 10 shows the active time in 3GPP LTE.

FIG. 10 shows the active time in 3GPP LTE.

If DRX is configured, UE has to perform an operation on each subframe as follows:

If an HATQ RTT timer expires in the subframe, but the data of a corresponding HARQ process is not successfully decoded:

A drx-Retransmission timer for the corresponding HARQ process is driven.

If a DRX command MAC Control Element (CE) is received:

An on Duration timer and a drx-Inactivity timer are stopped.

If a drx-Inactivity timer expires or a DRX command MAC CE is received within the subframe:

If a short DRX cycle has been configured: a drx-ShortCycle timer is started or restarted and a short DRX cycle is used.

If not: a long DRX cycle is used.

If the drx-ShortCycle timer expires within the subframe:

A long DRX cycle is used.

If a short DRX cycle is used and [(SFN*10)+subframe number] modulo (short DRX-Cycle)=(drxStartOffset) modulo (short DRX-Cycle) is satisfied; or If a long DRX cycle is used and [(SFN*10)+subframe number] modulo (long DRX-Cycle)=drxStartOffset is satisfied:

An on Duration timer is driven.

During an active time, if, regarding a PDCCH-subframe, the subframe is not required for UL transmission for a half-duplex FDD UE operation and the subframe is not part of a configured measurement gap:

A PDCCH is monitored;

If the PDCCH indicates DL transmission or DL allocation has been configured for the subframe:

An HARQ RTT timer for a corresponding HARQ process is driven;

A drx-Retransmission timer for the corresponding HARQ process is stopped.

If the PDCCH indicates new DL or UL transmission:

A drx-Inactivity timer is driven or driven again.

The DRX cycle includes two types: a long DRX cycle and a short DRX cycle. The long DRX cycle having long duration can minimize the consumption of the battery of UE, and the short DRX cycle having short duration can minimize the delay of data transmission.

Figure 11:
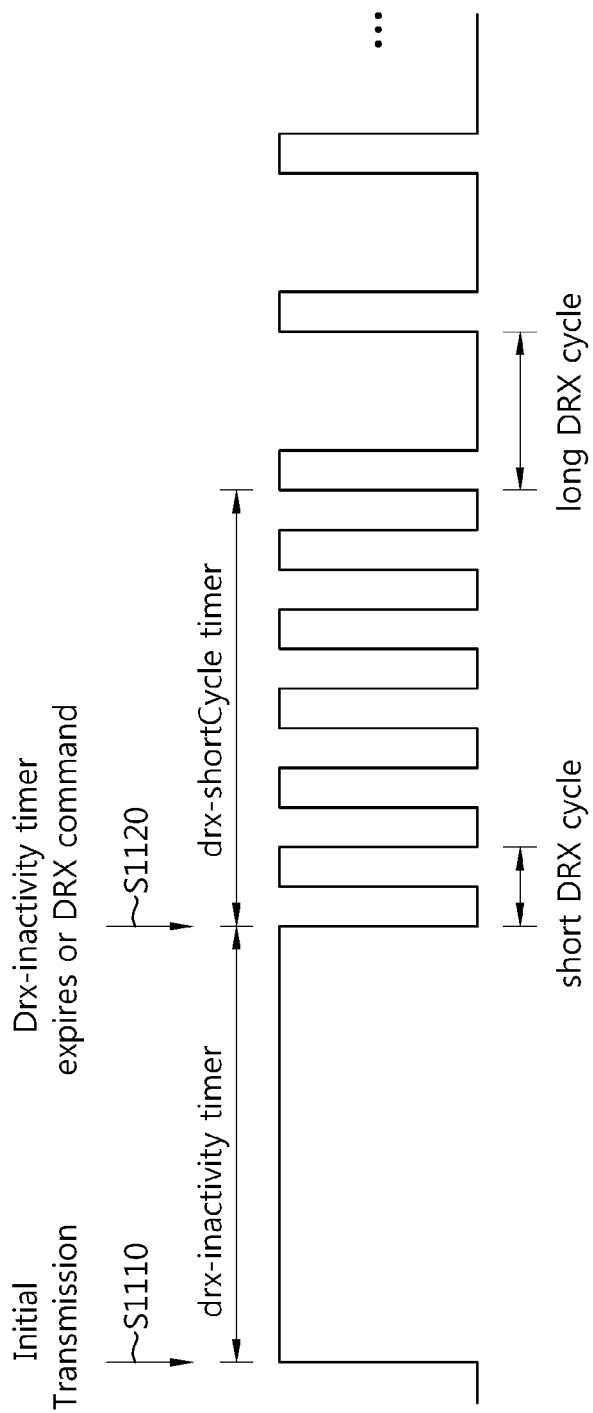
FIG. 11 shows an example of a switch of a DRX cycle.

FIG. 11 shows an example of a switch of a DRX cycle.

When initial transmission is received from a BS, a drx-Inactivity timer (also called a first timer or an inactivity timer) is initiated at step S1110. While the drx-Inactivity timer operates, UE continues to monitor a PDCCH.

If the drx-Inactivity timer expires or a DRX command is received from the BS, the UE shifts to a short DRX cycle at step S1120. Next, the UE initiates a drx-shortCycle timer (also called a second timer or a DRX cycle timer).

The DRX command may be transmitted as an MAC CE and may also be called as a DRX indicator that indicates a shift to DRX. The DRX command MAC CE is identified by the Logical Channel ID (LCID) field of an MAC PDU subheader.

While the drx-shortCycle timer operates, the UE operates in the short DRX cycle. When the drx-shortCycle timer expires, the UE shifts to a long DRX cycle.

If a short DRX cycle has been previously configured, the UE shifts to the short DRX cycle. If the short DRX cycle has been previously configured, the UE may shift to a long DRX cycle.

The value of the HARQ RTT timer is fixed to 8 ms (or 8 subframes), and other timer values, that is, the on Duration timer, the drx-Inactivity timer, the drx-Retransmission timer, and the mac-ContentionResolution timer may be set by a BS through an RRC message. The BS may set the long DRX cycle and the short DRX cycle through the RRC message.

In the above process, the DRX command MAC CE is an MAC CE that is used by an eNB when the eNB instructs UE to shift to a DRX state. As indicated in the above process, when the DRX command MAC CE is received from the eNB, UE shifts to a short DRX state if a short DRX cycle has been configured and shifts to a long DRX state if the short DRX cycle has not been configured.

The long DRX cycle and the short DRX cycle are only illustrative, and an additional DRX cycle may be configured.

When UE in a long DRX state detects a surrounding cell, the cycle of cell measurement and a measurement report may become long as a long idle time. This phenomenon may generate a problem when the introduction of a small cell having relatively small cell coverage, such as a pico cell or a femto cell, is spread. UE can move to the central part of a small cell during a short time when it detects the small cell. In this case, a problem related to connection with a macro cell may occur because the UE may be influenced by strong interference from the small cell.

The spread of the introduction of the small cell increases the mobility of UE, such as cell reselection and/or handover. Meanwhile, UE in a long DRX state may have a long delay time that it takes to receive a handover command from a BS owing to a long idle time. For this reason, the mobility of the UE to a small cell may not be properly performed.

In order to solve the possible problems, there is proposed a method changing a current DRX state according to circumstances and sending information about the change to a BS.

The DRX state of UE may be a long DRX state, a short DRX state, a state in which a DRX cycle of a specific value has been applied, and a state in which DRX has not been applied. The UE may switch between the states. The DRX cycle of a specific value may be previously defined on a wireless communication system operation specification or may be configured from a network.

For example, when UE in a long DRX state that uses a long DRX cycle checks a specific condition, the UE changes a current DRX cycle value into a short DRX cycle value and switches to the short DRX state. The short DRX cycle value is one of DRX configuration parameters configured when the UE receives an MAC configuration from the network.

The state in which the DRX cycle of a specific value has been applied may correspond to the case where a specific DRX cycle value has been previously defined on a communication operation specification. The specific DRX cycle may be defined as a specific value by defining new parameter TempDRX-Cycle or may be defined as a multiple of the existing short DRX/long DRX cycle value. The values may be transferred by a network through an MAC configuration which is included in an RRC connection establishment message or an RRC connection reestablishment message from among RRC messages.

A method of UE switching a DRX state in accordance with an embodiment of the present invention is described below.

Figure 12:
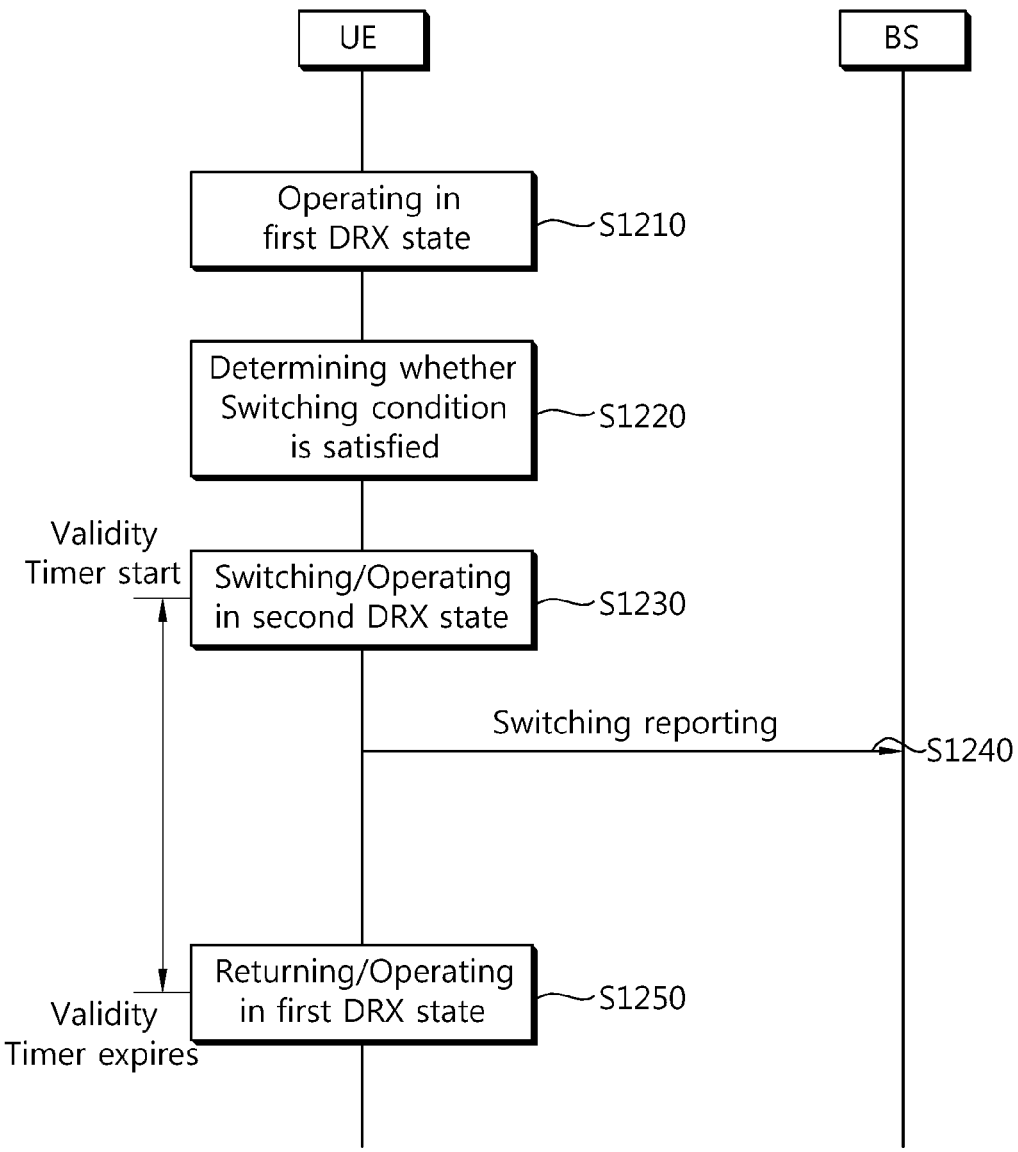
FIG. 12 is a diagram showing an example of a switch of a DRX state in accordance with an embodiment of the present invention.

FIG. 12 is a diagram showing an example of a switch of a DRX state in accordance with an embodiment of the present invention.

Referring to FIG. 12, UE operates ion a first DRX state at step S1210. The first DRX state may be a long DRX state in which a long DRX cycle is used.

The UE determines whether a switching condition has been satisfied at step S1220. If, as a result of the determination, it is determined that the switching condition has not been satisfied, the UE maintains the existing first DRX state and operates in the first DRX state.

If, as a result of the determination, it is determined that the switching condition has been satisfied, the UE switches to a second DRX state and operates in the second DRX state at step S1230. To switch from the first DRX state to the second DRX state may include changing a first DRX cycle, that is, a criterion for the operation of the first DRX state, into a second DRX cycle and operating based on the second DRX cycle. If the first DRX state is a long DRX state and the second DRX state is a short DRX state, UE which will switch the DRX state may change the long DRX cycle into the short DRX cycle and operate based on the short DRX cycle. Furthermore, in the second DRX state, only while the on DurationTimer operates, the UE can perform UL/DL transmission. That is, if the inactivityTimer operates outside the on-duration, the UE disregards the inactivityTimer. The UL transmission may include HARQ feedback, a preamble for random access, a scheduling request, and data transmission in a PUSCH. In the second DRX state, although both the short DRX cycle and the long DRX cycle are configured, the short DRX cycle is not operated, and the UE may directly shift to the long DRX cycle and operate.

The switching condition may include whether a measurement report event condition associated with a measurement object has been satisfied or not when UE measures the quality of the measurement object according to a measurement configuration received from a network. The subject of measurement and the measurement report event condition may be related to Table 1 above. A detailed measurement report event that may be used to switch a DRX state is as follows.

Event A1 (Serving Becomes Better than Threshold)

UE measures the quality of a serving cell (or measures the quality of one serving cell if the UE is now connected to a plurality of serving cells) now being accessed and compares the measured quality with a threshold defined in reportConfigEUTRA of a measurement configuration received from a network. If, as a result of the comparison, the quality of the serving cell is higher than the threshold, the UE may switch from the first DRX state, that is, a current DRX state, to the second DRX state, that is, a new DRX state.

Event A2 (Serving Becomes Worse than Threshold)

UE measures the quality of a serving cell (or measures the quality of one serving cell if the UE is now connected to a plurality of serving cells) now being accessed and compares the measured quality with a threshold defined in reportConfigEUTRA of a measurement configuration received from a network. If, as a result of the comparison, the measured quality of the serving cell is smaller than the threshold, the UE may switch from the first DRX state, that is, a current DRX state, to the second DRX state, that is, a new DRX state.

Event A3 (Neighbour Becomes Offset Better than PCell)

UE measures the quality of a serving cell (or a PCell if the UE is connected to a plurality of serving cells) now being accessed, measures the cell quality of the frequency of a measurement object associated with Event A3, and compares the quality measurement value with the PCell quality+an offset value. If, as a result of the comparison, the quality measurement value is greater than the PCell quality+an offset value, the UE may switch from the first DRX state, that is, a current DRX state, to the second DRX state, that is, a new DRX state.

Event A4 (Neighbour Becomes Better than Threshold)

UE now operates in a frequency different from a serving cell now being accessed, measures the cell quality of a frequency of a measurement object associated with Event A4, and compares the quality measurement value with a threshold defined in the measurement object. If, as a result of the comparison, the quality measurement value is greater than the threshold defined in the measurement object, the UE may switch from the first DRX state, that is, a current DRX state, to the second DRX state, that is, a new DRX state.

Event A5 (PCell Becomes Worse than Threshold 1 and Neighbor Becomes Better than Threshold 2)

UE measures the quality of a serving cell (or a PCell if the UE is connected to a plurality of serving cells) now being accessed and compares the measurement value with a threshold defined in a measurement configuration. If, as a result of the comparison, the measurement value is smaller than the threshold defined in the measurement configuration, the UE measures the cell quality of a frequency of a measurement object associated with Event A5 and compares the measurement value with a threshold defined in the measurement object. If, as a result of the comparison, the measurement value is greater than the threshold defined in the measurement object, the UE may switch from the first DRX state, that is, a current DRX state, to the second DRX state, that is, a new DRX state.

Event A6 (Neighbour Becomes Offset Better than SCell)

UE measures the quality of SCell when it is connected to a plurality of serving cells, measures the cell quality of a frequency of a measurement object associated with Event A6, and compares the measurement values with each other. If, as a result of the comparison, the measurement value of the measurement object is greater than the quality measurement value of the SCell, the UE may switch from the first DRX state, that is, a current DRX state, to the second DRX state, that is, a new DRX state.

Event B1 (Inter RAT Neighbor Becomes Better than Threshold)

UE measures the cell quality of a frequency of a measurement object associated with Event B1 and compares the measured cell quality with a threshold defined in a measurement object. If, as a result of the comparison, the quality measurement value is greater than the threshold, the UE may switch from the first DRX state, that is, a current DRX state, to the second DRX state, that is, a new DRX state.

Event B2 (PCell Becomes Worse than Threshold 1 and Inter RAT Neighbor Becomes Better than Threshold2)

UE measures the quality of a serving cell (or a PCell if the UE is connected to a plurality of serving cells) now being accessed and compares the measurement value with a threshold defined in a measurement configuration. If, as a result of the comparison, the measurement value is smaller than the threshold, the UE measures the cell quality of a frequency of a measurement object associated with Event B2 and compares the measurement value with a threshold defined in the measurement object. If, as a result of the comparison, the measurement value is greater than the threshold defined in the measurement object, the UE may switch from the first DRX state, that is, a current DRX state, to the second DRX state, that is, a new DRX state.

Meanwhile, whether the switching condition is satisfied may be determined depending on the position of UE. If UE enters a specific area, the UE may switch to the second DRX state and operate in the second DRX state. The UE needs to previously know the specific area in order to determine whether the switching condition has been satisfied based on the position.

The range of the specific area may be an area set by a network. The UE receives information related to the specific area from the network. A point of time at which the UE receives the information may be before the UE enters the specific area. A point of time at which the UE receives the information may be the time when the network determines that the UE has entered the corresponding area. Table 2 below shows an example of the information related to the specific area which is given to the UE by the network.

TABLE 2

| Specific Location Information (BS –> UE) |
| --- |
| Center Position (latitude, longitude)<br>Radius [Meter]<br>Validity Time [Hour] |

The information related to the specific area may be included in a DRX configuration included in an RRC connection establishment message, an RRC connection reestablishment message and/or an RRC connection reconfiguration message from a network and then transmitted.

The UE which has received the information related to the specific area from the network may compare the received information with information about its own position and determine whether the current position of the UE falls within the specific area indicated by the information related to the specific area, received from the network, based on a result of the comparison. More particularly, the UE may determined that the UE has entered the specific area if, as a result of the comparison, a difference between the central position of the specific area and the position of the UE is smaller than a radius.

The UE which has received the information related to the specific area operates a validity timer from a point of time at which the information related to the specific area was received and determines that the information related to the specific area is valid during only the valid time. If the UE is now operating in a new DRX state in the valid time, the UE may switch to the existing DRX state and operate in the existing DRX state after the valid time elapses. Furthermore, the information related to the specific area whose valid time has elapsed may be discarded. The valid time for the information related to the specific area may be operated independently from a valid time at which the UE switches to the second DRX state and operates in the second DRX state.

Meanwhile, the specific area may be an area that is not designated by a network, but is determined by the UE. For example, if the UE has visited a small cell before, the UE may set an area where the small cell is placed as the specific area. If there is valid GPS position information (latitude, latitude), the UE may store the corresponding information. The UE may also store the cell ID of the corresponding cell along with the corresponding information.

Next, when the UE approaches the set specific area, the UE may determine that the switching condition has been satisfied, switch from the first DRX state to the second DRX state, and operate in the second DRX state. The UE may determine that it has approached the specific area if a difference between the stored position of the specific area and the current position of the UE is smaller than a specific value. The specific value may be a predetermined value or may be a value determined by the UE when the UE detects a cell. In some embodiments, the UE may obtain information about the specific area through system information or other message received from a corresponding small cell.

The UE may directly know whether the switching condition has been satisfied from a network. When the UE enters a specific area, such as a hot spot, the network may send an indication message, instructing the UE to switch a DRX state, to the UE. The indication message may be transferred through an MAC CE.

Figure 13:
FIG. 13 shows an example of an MAC CE for a DRX switch indication message.
Figure 13:
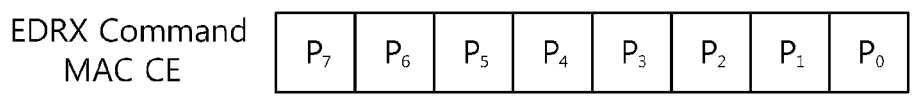

FIG. 13 shows an example of an MAC CE for a DRX switch indication message.

Referring to FIG. 13, the LCID of an MAC subheader is used to identify an EDRX command. EDRX command MAC CEs (P7~P0) having a specific pattern may mean the use of a predetermined DRX cycle. Table 3 below is an example of an EDRX command MAC CE having a specific pattern.

TABLE 3

| EDRX command MAC CE | DRX cycle (sub-frame) |
| --- | --- |
| 00000000 | Sf2 |
| 00000001 | Sf5 |
| 00000010 | Sf8 |
| 00000011 | Sf10 |
| ... | ... |
| 11111110 | Sf512 |
| 11111111 | Sf640 |

Meanwhile, the DRX switch indication message may be transmitted through an RRC message, such as an RRC connection reconfiguration message. UE may change the existing DRX configuration through the RRC connection reconfiguration message and change a DRX cycle value according to a DRX state. The UE may inform a network that the DRX cycle has been changed by adding a 1-bit indication bit to the existing RRC message.

Furthermore, whether the switching condition is satisfied or not may be determined depending on an interference state due to communication modules that coexist within UE. If interference is expected or generated due to coexisting communication modules, UE may switch to the second DRX state and operate in the second DRX state. In relation to the above, the operations of UE and a BS in an IDC environment are described below.

Figure 14:
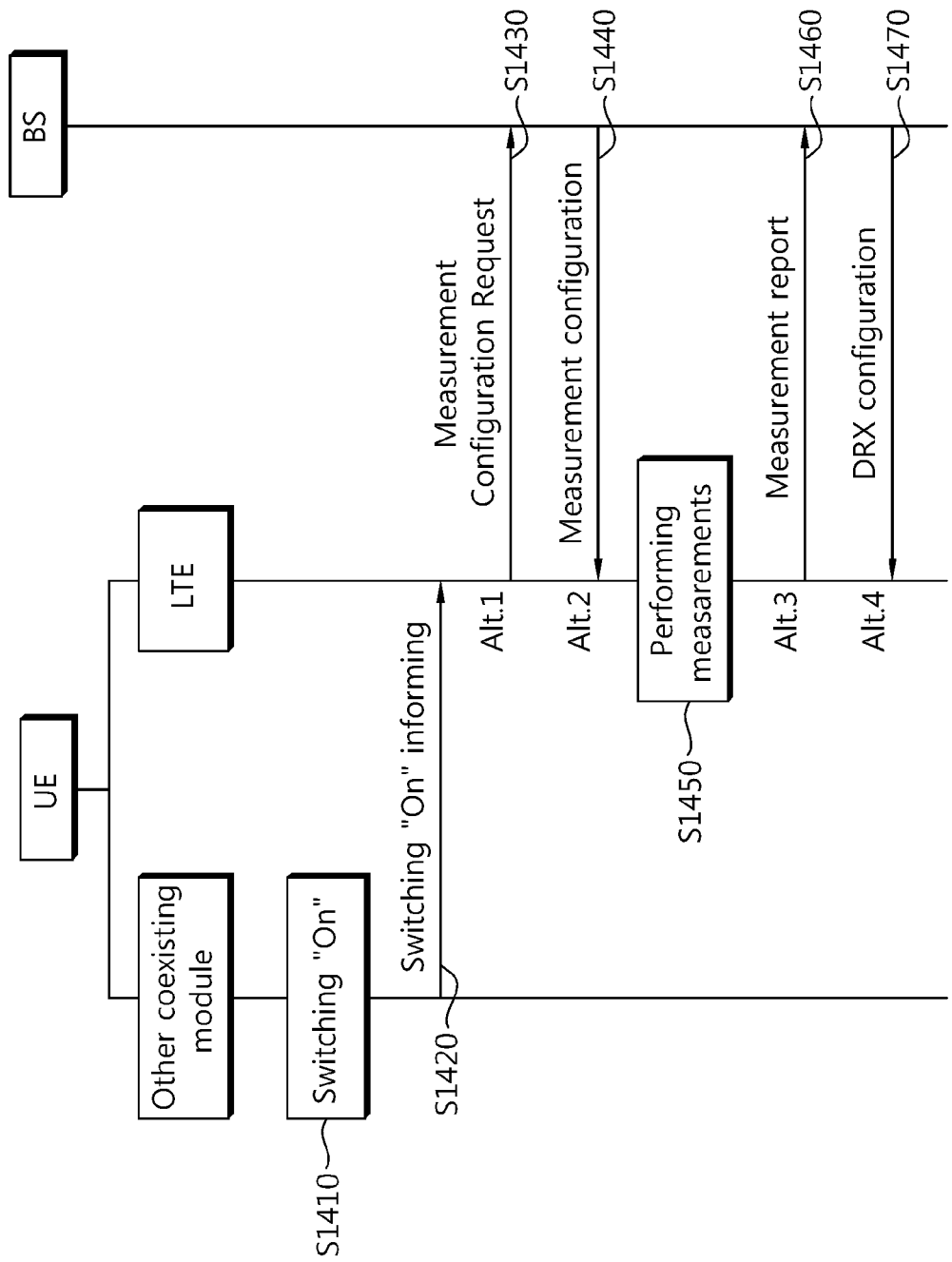
FIG. 14 is a diagram showing an example of a communication method in an IDC environment to which the embodiment of the present invention may be applied.

FIG. 14 is a diagram showing an example of a communication method in an IDC environment to which the embodiment of the present invention may be applied.

Referring to FIG. 14, UE includes an LTE module and the other coexistence module.

When the other coexistence module switches on and operates at step S1410, the other coexistence module informs the LTE module that the other coexistence module switches on and operates at step S1420.

The LTE module sends a measurement configuration request, including frequencies subject to interference due to the other coexistence module or a frequency that may be potentially subject to interference due to the other coexistence module, to a BS at step S1430. The frequency may be a serving and/or non-serving frequency.

In response to the measurement configuration request received from the LTE module, the BS sends a measurement configuration for the frequencies included in the measurement configuration request, to the UE at step S1440.

The LTE module performs measurement based on the measurement configuration at step S1450.

When a measurement report condition related to the measurement configuration is triggered, the LTE module reports a result of the measurement to the BS at step S1460.

If a network stage including the BS determines that IDC interference is severe based on a result of the measurement, the network stage configures a new DRX configuration for the UE so that the UE may switch the DRX state at step S1470.

Here, steps S1430, S1440, S1460, and S1470 may be used as the DRX state switch conditions of the UE. The use of each step as the switching condition is described below.

Alt. 1 (related to step S1430): if the LTE module satisfies a condition that informs the BS of the IDC problem, the UE may determine to switch to the second DRX state. That is, the condition means that it is expected that the transmission of a coexistence module 1 within the UE will give internal interference to the reception of a coexistence module 2 or the transmission of a coexistence module 1 is giving internal interference of a specific level or higher to the reception of a coexistence module 2. When the IDC problem is informed, the BS recognizes that the UE has switched to the second DRX state. The internal interference may be expected in the following cases.

1) When the other communication module other than the LTE module is powered on.

2) When the application program or session of the other communication module other than the LTE module starts operating.

3) When the LTE module receives an indication that interference from the other communication module will occur.

Alt. 2 (related to S1440): If the LTE module receives information about an additional measurement configuration for handover from a network after the LTE module sends an indication informing the IDC problem to the corresponding network, the LTE module may determine to switch to the second DRX state. After the information about the measurement configuration is transmitted to the corresponding UE, the BS recognizes that a switch to the second DRX state has occurred within the UE.

Alt. 3 (related to S1460): After the LTE module performs measurement based on the information about an additional measurement configuration configured in Alt. 2, when a result of a measurement report is triggered or right after the LTE module sends a result of a measurement report to the BS, the LTE module may determine to switch to the second DRX state. When a result of the measurement report is received, the BS recognizes that a switch to the second DRX state has occurred within the UE.

Alt. 4 (related to S1470): After the LTE module receives an explicit indicator from the BS, the LTE module may determine to switch to a third DRX state. The third DRX state may be the second DRX state or a new third DRX state.

Referring to FIG. 12, the UE which has switched to the second DRX state and started operating reports that it has switched to the second DRX state to a network. To this end, the UE may send a switch report message, including information about the switched DRX state, to the BS at step S1240. The information may be transmitted through an RRC message transmitted to the BS. In some embodiments, the UE may send an MAC message, including information about the DRX cycle related to the second DRX state, to the BS. Table 4 below shows an example of the information about the switched DRX state reported from the UE to the BS.

TABLE 4

| DRX state information (UE -> Network) | Value |
|---|---|
| New DRX cycle | Sf2, Sf5, Sf10, . . . , Sf640 |
| Cause | Small cell detection, . . . |
| Cell information | Physical Cell ID, Cell location info(latitude, longitude) |

The UE may drive a validity timer when it switches to the second DRX state and starts operating. After switching to the second DRX state, the UE may drive the validity timer in order to set the valid time of the switched DRX state. The value of the validity timer may be previously defined on a wireless communication system operation specification or may be set by the network. Meanwhile, if the UE sends the switch report message and drives the validity timer, a validity timer value may be further included in the DRX state information of the switch report message.

When a specific condition is satisfied or when a specific condition occurs, the UE switches to the first DRX state and operates in the first DRX state at step S1250. A condition and/or situation that the UE switches to the first DRX state again may be as follows.

When the validity timer for the second DRX state expires: When the validity timer expires, the UE changes/applies the second DRX cycle value, that is, a criterion for a current operation, to the previous first DRX cycle value, switches to the first DRX state and operates in the first DRX state.

When a specific event condition is satisfied: When a specific event condition is satisfied, the UE may change/apply the second DRX cycle value, that is, a criterion for a current operation, to the previous first DRX cycle value, switch to the first DRX state and operate in the first DRX state. It may be an event condition configured through the existing measurement configuration or may be a newly defined event condition.

When a specific area is deviated: When the UE is out of a specific area, that is, a criterion for a switch to the second DRX state, the UE may switch to the previous first DRX state and operate in the first DRX state.

1) If the specific area is an area set by a network, the UE compares information about the set area with its position. If, as a result of the comparison, it is determined that the UE is out of the set specific area, the UE may switch to the previous first DRX state and operate in the first DRX state.

2) If the specific area is an area determined by the UE, such as an area where a small cell that the UE has previously visited is placed, the UE may switch to the previous first DRX state and operate in the first DRX state.

3) When an indication message indicating that the UE is out of the specific area, such as a hot spot, is received from a network, the UE may switch to the previous first DRX state and operate in the first DRX state.

When the UE switches a DRX state according to the existing DRX state switch procedure: If a condition for a change of the defined DRX state is satisfied, the UE switches to a corresponding DRX state. For example, if the UE has switched from a long DRX state to a short DRX state, when the existing drxShortCycleTimer expires, the UE may switch to the long DRX state. In contrast, the UE may disregard the existing DRX state switch procedure and determine that only a newly defined DRX switch procedure is valid. That is, if the validity timer expires and a specific event condition is not satisfied although the drxShortCycleTimer expires in the previous DRX state, the UE may not switch the DRX state.

When a switch message is received: When a message instructing that the UE switch a DRX state is received from a network, the UE may switch to the DRX state indicated by the network and operate in the switched DRX state. For example, when a network sends a message, instructing that the UE switch to the previous first DRX state and operate in the first DRX state, to the UE, the UE may switch to the first DRX state and operate in the first DRX state in response to the message.

When internal interference disappears: If internal interference, that is, a criterion for a switch to the second DRX state, disappears, the LTE module may switch to the previous first DRX state and operate in the first DRX state. More particularly, the LTE module may determine that internal interference has disappeared in the following cases.

1) When the other communication module other than the LTE module is powered off.

2) When the application program or session of the other communication module other than the LTE module stops operating.

3) When the LTE module receives an indication, indicating that interference will appear or internal interference of a specific level or lower is generated, from the other communication module.

4) When the LTE module determines that it receives internal interference of a specific level or lower from the other communication module.

In accordance with the embodiments described with reference to FIGS. 12 to 14, when the switching condition is satisfied, UE may operate based on a short DRX state or other specific DRX cycle. In this case, the UE may stably receive an indication message related to the mobility of the UE, such as a handover command message, from a network. In an overall wireless communication condition in which the introduction of small cells, such as femto cells or pico cells, is spread, the mobility of UE is further in-creasing. In this condition, in accordance with the embodiments of the present invention, in environments in which mobility is frequently required, UE may reduce the DRX cycle and thus stably receive a message related to mobility. In other environments, the UE may operate in a previous DRX cycle and thus not perform an unnecessary monitoring operation. Accordingly, the reliability and throughput of the entire wireless communication system can be improved.

Figure 15:
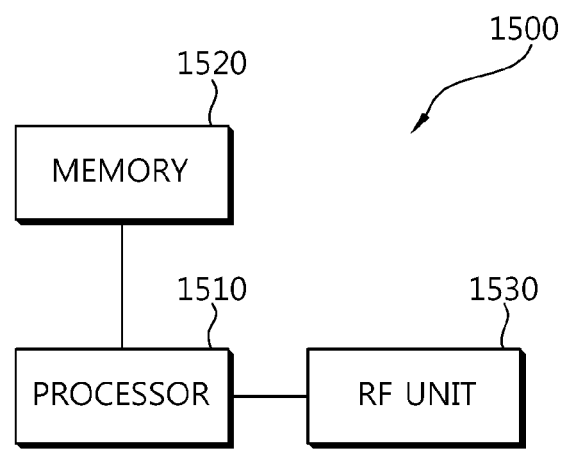
FIG. 15 is a block diagram of a wireless apparatus to which the embodiments of the present invention may be applied.

FIG. 15 is a block diagram of a wireless apparatus to which the embodiments of the present invention may be applied. The wireless apparatus may embody the UE and/or the BS described in connection with the embodiments of FIGS. 12 to 14. The wireless apparatus may embody IDC UE.

The wireless apparatus 1500 includes a processor 1510, memory 1520, and a Radio Frequency (RF) unit 1530. When the wireless apparatus 1500 is IDC UE, the IDC UE may include one or more RF units for transmitting and receiving radio signals according to respective communication systems. The processor 1510 embodies the proposed functions, processes and/or methods. The processor 1510 may be embodied to perform an operation based on a specific DRX state. The processor 1510 may be embodied to determine whether or not to switch the DRX state. The processor 1510 may be embodied to a switch of a DRX state to the network. In the embodiments of FIGS. 12 to 14, the operation of the UE may be embodied by the processor 1510.

The RF unit 1530 is connected to the processor 1510 and configured to transmit and receive radio signals.

The processor 1510 may include Application-Specific Integrated Circuits (ASICs), other chipsets, logic circuits, or data processors or all of them. The memory 1520 may include Read-Only Memory (ROM), Random Access Memory (RAM), flash memory, memory cards, storage media and/or other storage devices. The RF unit 1530 may include a baseband circuit for processing a radio signal. When the above-described embodiment is implemented in software, the above-described scheme may be implemented using a module (process or function) that performs the above function. The module may be stored in the memory 1520 and executed by the processor 1510. The memory 1520 may be placed inside or outside the processor 1510 and connected to the processor 1510 using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The invention claimed is:

1. An operation method performed by a user equipment in a wireless communication system, the operation method comprising:
    determining whether to switch a Discontinuous Reception (DRX) state;
    switching to a new DRX state and operating in the new DRX state, if it is determined to switch to the DRX state; and
    reporting the switching of the new DRX state to a network,
    wherein the new DRX state is based on a new DRX cycle comprising an on-duration for which a downlink channel is monitored and an off-duration for which the downlink channel is not monitored,
    wherein the switching of the new DRX state is operated when the user equipment enters a specific area,
    wherein the specific area corresponds to a small cell which the user equipment has previously visited, and
    wherein the user equipment enters the specific area when a distance between a position of the user equipment and a position of the small cell is smaller than a specific value.

2. The operation method of claim 1, further comprising:
    switching to a previous DRX state and operating in the previous DRX state when the user equipment is out of the specific area.

3. The operation method of claim 1, further comprising:
    receiving information about the specific area from the network,
    wherein the information about the specific area comprises:
        a central position of the specific area;
        a radius of the specific area; and
        a valid time of the information about the specific area.

4. The operation method of claim 3, further comprising:
    switching to a previous DRX state and operating in the previous DRX state when the valid time elapses from a point of time at which the information about the specific area was received.

5. The operation method of claim 1, further comprising:
    receiving a measurement configuration from the network,
    wherein the measurement configuration comprises
        measurement object information indicating a measurement object to be measured by the user equipment; and
        measurement report event information indicating a condition for reporting a measurement value for the measurement object, and
    wherein the step of determining to switch the DRX state comprises determining to switch to the DRX state when the measurement value for the measurement object satisfies the condition indicated by the measurement report event information.

6. The operation method of claim 1, wherein if the user equipment is In-Device Coexistence (IDC) user equipment and the user equipment comprises other coexistence communication module, the user equipment determines to switch the DRX state based on IDC internal interference according to a start of an operation of the other coexistence communication module.

7. The operation method of claim 1, further comprising receiving information about the new DRX state,
    wherein the information about the new DRX state comprises a validity timer indicating the new DRX cycle and duration of the new DRX state.

8. The operation method of claim 7, further comprising:
    switching to a previous DRX state and operating in the previous DRX state if time indicated by the validity timer elapses after switching to the new DRX state.

9. A user equipment operating in a wireless communication system, the user equipment comprising:
    a Radio Frequency (RF) unit configured to transmit and receive radio signals; and
    a processor functionally connected to the RF unit, wherein the processor is configured to:
    determine whether to switch a Discontinuous Reception (DRX) state,
    switch to a new DRX state and operate in the new DRX state, if it is determined to switch to the DRX state, and
    report the switching of the new DRX state to a network, and
wherein the new DRX state is based on a new DRX cycle, comprising an on-duration for which a downlink channel is monitored and an off-duration for which the downlink channel is not monitored,
wherein the switching of the new DRX state is operated when the user equipment enters a specific area,
wherein the specific area corresponds to a small cell which the user equipment has previously visited, and
wherein the user equipment enters the specific area when a distance between a position of the user equipment and a position of the small cell is smaller than a specific value.

10. The user equipment of claim 9, wherein the processor is configured to switch to a previous DRX state and operate in the previous DRX state when the user equipment is out of the specific area.

11. The user equipment of claim 9, wherein:
    the processor is configured to receive information about the specific area from the network, and
    the information about the specific area comprises:
        a central position of the specific area;
        a radius of the specific area; and
        a valid time of the information about the specific area.

12. The user equipment of claim 11, wherein the processor is configured to switch to a previous DRX state and operate in the previous DRX state when the valid time elapses from a point of time at which the information about the specific area was received.

13. The user equipment of claim 9, wherein:
    the processor is configured to receive a measurement configuration from the network,
    the measurement configuration comprises measurement object information indicating a measurement object to be measured by the user equipment and measurement report event information indicating a condition for reporting a measurement value for the measurement object, and
    the user equipment determines to switch the DRX state when the measurement value for the measurement object satisfies the condition indicated by the measurement report event information.

14. The user equipment of claim 9, wherein if the user equipment comprises a second RF unit configured to transmit and receive radio signals different from the radio signals of the RF unit, determining to switch the DRX state is based on In-Device Coexistence (IDC) internal interference according to the transmission and reception of the different radio signals of the second RF unit.

15. The user equipment of claim 9, wherein:
    the processor is configured to receive information about the new DRX state, and
    the information about the new DRX state comprises a validity timer indicating the new DRX cycle and duration of the new DRX state.

16. The user equipment of claim 15, wherein the processor is configured to switch to a previous DRX state and operate in the previous DRX state if time indicated by the validity timer elapses after switching to the new DRX state.

* * * * *